United States Patent [19]

Proni

[11] Patent Number: 4,530,523
[45] Date of Patent: Jul. 23, 1985

[54] UNITARY CANTILEVER CLAMP ACTION FITTING WITH A SPLIT END

[75] Inventor: Oscar Proni, Hollywood, Fla.

[73] Assignee: Proni Industries, Inc., Miami, Fla.

[21] Appl. No.: 339,695

[22] Filed: Jan. 15, 1982

[51] Int. Cl.³ ............................................. F16L 21/06
[52] U.S. Cl. .................................. 285/179; 285/322; 403/290
[58] Field of Search ............... 285/322, 243, 179, 257, 285/245; 403/290, 371; 411/433, 432, 280, 237

[56] References Cited

U.S. PATENT DOCUMENTS

| 1,615,233 | 1/1927 | Redinger | 403/290 X |
| 1,659,268 | 2/1928 | Hooley | 285/322 |
| 1,799,762 | 4/1931 | Rathbun | 285/322 X |
| 1,802,381 | 4/1931 | Hofbauer . | |
| 2,179,930 | 11/1939 | Harrington | 285/243 |
| 2,383,692 | 8/1945 | Smith | 285/322 |
| 2,406,346 | 8/1946 | Buchanan . | |
| 2,463,179 | 3/1949 | Iftiger, Sr. . | |
| 3,233,924 | 2/1966 | Stanley et al. . | |
| 3,476,412 | 11/1969 | Demler, Sr. . | |
| 3,501,177 | 3/1970 | Jacobs . | |
| 3,576,334 | 4/1971 | Hemens . | |
| 3,604,737 | 9/1971 | Tarpey . | |
| 3,843,169 | 10/1974 | Wise | 285/322 X |
| 4,095,914 | 6/1978 | Thomsen | 403/290 X |
| 4,116,472 | 9/1978 | Schmitt . | |
| 4,250,348 | 2/1981 | Kitagawa . | |
| 4,302,035 | 11/1981 | Ochwat . | |
| 4,304,422 | 12/1981 | Schwarz . | |
| 4,328,979 | 5/1982 | Stoll . | |

FOREIGN PATENT DOCUMENTS

| 2442392 | 7/1980 | France | 285/322 |
| 14477 | 8/1957 | Japan . | |
| 14070 | 3/1958 | Japan . | |
| 10233 | 4/1965 | Japan . | |
| 33624 | 8/1977 | Japan . | |
| 87205 | 8/1936 | Sweden | 285/322 |
| 182789 | 5/1936 | Switzerland . | |
| 1047869 | 11/1966 | United Kingdom | 403/290 |

OTHER PUBLICATIONS

"Design Engineering"—Dec. 1981, pp. 33–38.
Jaco Manufacturing Co., Jaco Vibra-Pruf Tube Fittings 5M 12-81 LSP.
The Lenz Company, Catalog No. 127R-A, O-Ring Seal Tube Fittings, Form No. TF-127R-A 6/80 15M.

*Primary Examiner*—Thomas F. Callaghan
*Attorney, Agent, or Firm*—Wegner & Bretschneider

[57] ABSTRACT

An externally commonly threaded split end fitting having a surface serving as a camming surface for an end-mounted nut. By advancing the nut along the split end of the fitting the camming surface reacting upon the nut causes a transmission of force through the nut onto the external threads of the split segmented end of the fitting causing in turn a radially inward pivoting of the jaw-like segments of the split head. The longitudinal axis of the fitting has a passageway for receiving a work piece, whereby the pivoting of the segments clamp the workpiece into the fitting. The fitting is unitary.

12 Claims, 8 Drawing Figures

UNITARY CANTILEVER CLAMP ACTION FITTING WITH A SPLIT END

BACKGROUND OF THE INVENTION

This invention relates to a fitting having a split end, each segment of which forms a cantilever serving as jaws for clamping a workpiece within the body of the fitting. The clamping force is provided by the tightening of a nut of the invention with a camming surface being provided by another position of the fitting.

There are a variety of fittings available on the market today. One class of fittings, hydraulic or pneumatic fittings, involve deformation or flaring of the tube or workpiece on which they are applied; another class of fittings, Swage-Lock, require a wedging action by taper rings sealing the workpiece but again deforming the workpiece. A nut is generally used to provide the required compressional force.

Split head clamping fasteners have been known for some time, particularly in the field of electrical connectors. Patents illustrating such fasteners include U.S. Pat. Nos. 368,149; 1,802,381; 2,406,346; and 2,440,828 for holding electrical wires.

Although these prior art type of fittings and fasteners are useful, they have several drawbacks including the use of several mating parts, deformation of the workpiece, and multiple turns at high strength of the forcing nuts.

The present invention includes several advantages over the fittings and fasteners of the prior art. These advantages include the clamping action, which is achieved by a cantilever bending action rather than a high force requiring wedging action; the containment of the camming surface and nut as integral parts of the fitting; the non-movement of the workpiece or workpieces within the fitting as the clamping action takes place; the unitary construction of the fitting resulting in the lack of a requirement for several mating parts; the small amount of rotation, only a fraction of a turn of fitting nut is required for full clamping action; and the reusability of the fitting.

SUMMARY OF THE INVENTION

The invention seeks to provide a clamp action fitting with a split externally threaded, segmented end which minimizes the deficiencies of prior art fittings. The disclosed embodiments of the invention attain the clamping action by virtue of two simultaneous coactions; the first action occurs between a nut as it is being tightened on a threaded, segmented end of the fitting and a surface transverse to the longitudinal axis of the fitting, said surface being an integral part of the fitting; the second action occurs between the threads of the nut and the threads of the segmented end. Each end segment has a common thread.

The end of the fitting is segmented by two or more slots. Each of the segments forms a cantilever. As the face of the nut is moved into contact with said transverse surface, the nut experiences a reactive force directed against the nut's direction of forward motion. This reactive force is transmitted from the nut forward surface to the nut threads by the body of the nut. The nut's threads then exert a force on the externally threaded end segments of the fitting which results in a bending movement for each segment. This bending movement is generated in any cantilever.

The cantilevers or segments are thus forced inward by the force exerted on the segments thereby providing the clamping action. The fitting contains an axial passageway into which a workpiece, such as a tube, may be placed. A tube or other workpiece is rigidly held in place by the clamping action of the fitting. A principal advantage of the invention is that the workpiece is not forced to rotate or move in any way as said nut is tightened. The invention works on the basis of a clamping action as opposed to a wedging or deformation action which is characteristic of much of the prior art.

Each embodiment of the invention uses a clamping action involving only integral parts of the fitting so that the fitting is unitary; however, a fitting can have one split end or two or more split ends depending on the application. The slots dividing the end or ends into segments may be longitudinal through the axis or not, skewed, or of general curved form.

The body is not limited to the embodiments disclosed in this document.

BRIEF DESCRIPTION OF THE DRAWINGS

The many variables of the subject fitting are illustrated as follows.

DESCRIPTION OF THE PREFERRED EMBODIMENTS

Figure 2:
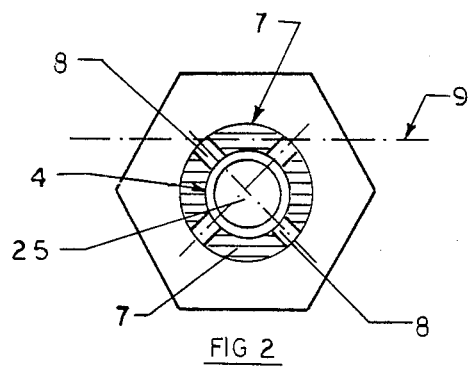
FIG. 2 presents a cross section of the fitting showing the split segmented end, each segment of the end forming a cantilever. The cross section of four such segments is shown. Also shown is a workpiece or tube to be clamped.
Figure 3:
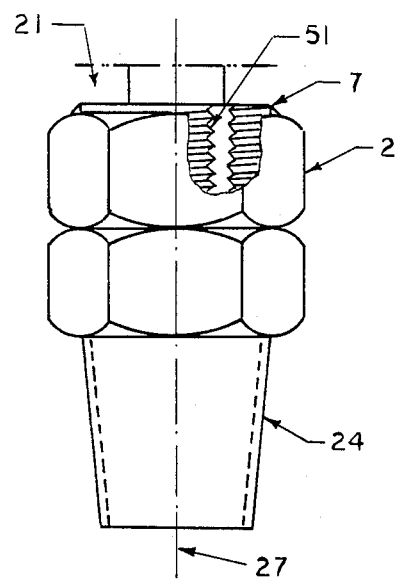
FIG. 3 is a side view of the fitting showing a partial view of one longitudinal slot.

The complete fitting embodiment shown in FIGS. 1-4 is designated 10 with a nut, 2, an "O" ring, 3; and a main body, 1; body 1 being subdivided into a split segmented end, 21, a transversal surface, 22, an external indentation, 23, serving to separate the segmented end, 21, and the transversal surface, 22; a remaining section, 24, and a central axial passageway, 25, running the entire length of the main body, 1. The split segmented end 21 is split into a plurality of segments by a plurality of slots, 8; each segment having a common external thread, 51, and each segment forming a cantilever; four such slots 8 and four such segments 7 are shown in the embodiment illustrated in FIG. 2. The split segmented end 21, of the main body 1 shown in FIG. 2, is divided into four equal segments by four longitudinal slots which are equidistantly spaced; however, more or less slots could be employed producing more or less segments respectively; a minimum of two slots is required.

Figure 4:
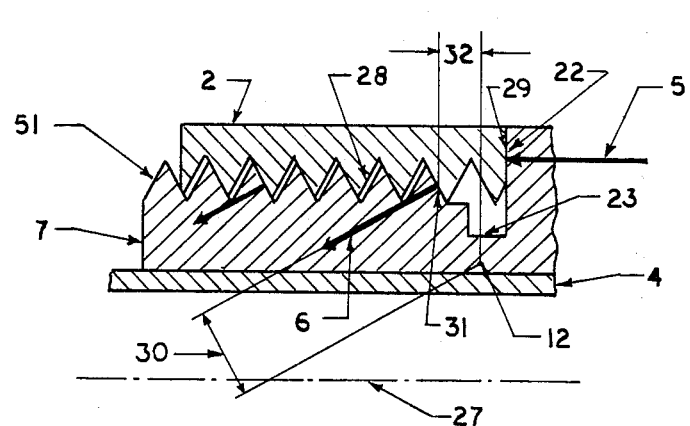
FIG. 4 is a detail of the split segmented end of the embodiment of FIGS. 1, 2, and 3. Clearly shown is one segment in a side sectional view. This segment forms a cantilever secured at the point of the indentation. The external threads of the segment are shown as are the threads of the fitting nut. Also shown are some of the coacting forces of the invention which result in the clamping action.

FIG. 4 shows a detailed sectional view of a single segment, 7, from segmented end 21, a sectional view of external indentation 23, a sectional view of a portion of body 1 including transversal surface 22 and a sectional view of nut 2. The surface, 22, joining the indentation 23 to the rest of the body is a camming surface or reactive force surface for nut 2. Surface 22 is generally perpendicular to the axis 27 of axial passageway 25. Shown also in FIG. 4, in the sectional view of segment 7 are the external threads, 51, of segment 7. Each end segment, 7, is externally threaded. Shown also in FIG. 4 are the threads, 28, of nut 2 and a workpiece, in this case a tube, 4. Each of the end segments forms a cantilever, with threaded segment, 7, being the projected member of the cantilever and the member being supported at the indentation 23. The neutral axis, 9, of the cross section through indentation 23 for one end segment, 7, is shown in FIG. 2. The neutral axis reduces to a point, 12, in FIG. 4. A bending moment is generated in any cantilever.

Figure 1:
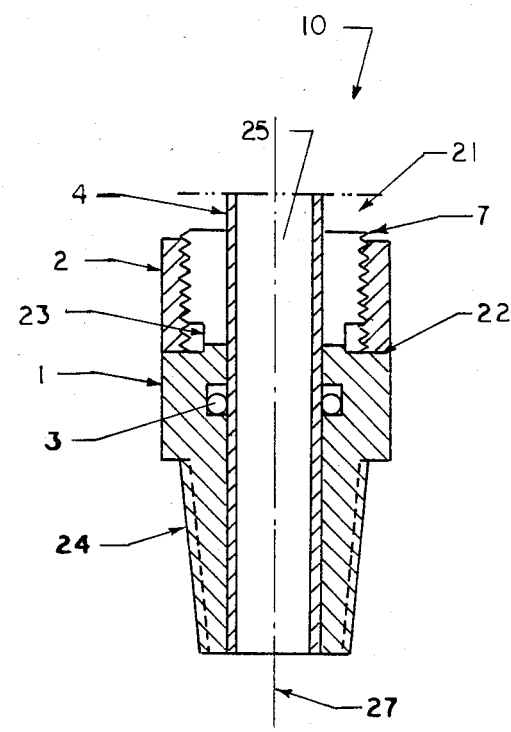
FIG. 1 is an axial sectional view of the fitting including a nut, an "O" ring and the main body; the main body being made up of a split segmented end, a transversal surface, an external indentation, a remaining section, and a central axial passageway running the entire length of the main body. Also shown is a workpiece or tube which will be clamped by the fitting.

In operation, fitting 10 clamps and holds a workpiece such as tube 4 in FIGS. 1 and 4 in place. The clamping action begins with the tightening of nut 2. As nut 2 is tightened, its leading edge, 29, approaches surface 22. When surface 29 contacts surface 22, a reactive force, 5, is produced; as nut 2 continues to be tightened, surface 22 acts as a camming surface. As is shown in FIG. 4, force 5 is transmitted via the body of nut 2 to the threads 51 of cantilever segment 7 resulting in the production of a plurality of forces of which only one force, 6, is numbered. Forces, 6, drive or move the segment or cantilever, 7, radially inward thus clamping the workpiece or tube 4 in place. This action is simultaneously produced in all end segments, 7, thus clamping the workpiece, 4, rigidly in place.

A key factor in clamping action is the magnitude of the distance, 30, shown in FIG. 4. The distance, 30, is distance from the point of strongest force, of type 6, application to the neutral axis projection, point 12. Force, of type 6, is not uniform along the threads, 13, and is strongest at thread surface 31. Thus the distances, 30 and 32, in FIG. 4 are of critical importance to the force level, 6, required for the onset and level or strength of the clamping action.

The forces, 6, prevent any axial motion of the tube, 4, when elevated pressure exists inside the tube and fitting. The "O" ring, 3, shown in FIG. 1, prevents the escape of any fluid flowing in tube 4 and fitting 10 if the fluid should infiltrate between the end of tube 4 and body 1.

Figure 5:
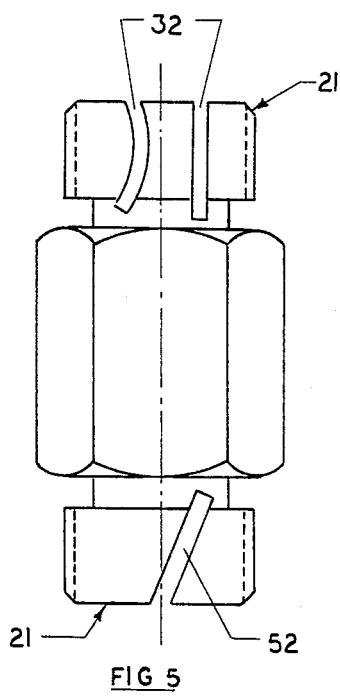
FIG. 5 shows a side view of the fitting with ends segmented by skewed, curved, or longitudinal slots. The longitudinal slots shown in this figure do not pass through the center of the fitting. The longitudinal slots shown in FIG. 2 do pass through the central axis of the fitting.
Figure 8:
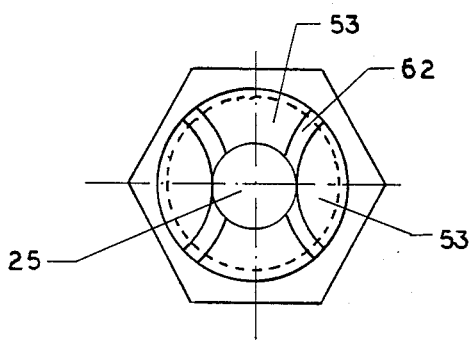
FIG. 8 shows an end view of a fitting wherein yet another slot, a cylindrical slot, is employed.

In FIG. 2 the split segmented end of fitting 10 is shown to have four longitudinal slots in the preferred embodiment of FIGS. 1, 2, 3, and 4. The slots shown in FIG. 1 extend axially to point 12 of FIG. 4. In FIG. 5 another fitting embodiment is shown wherein the split segmented end 21 is segmented by various types of slots, 32. These slots are not radial in that they do not transect the central axis 27 of the axial passageway 25 as do slots 8. Slot 52, shown in FIG. 5, is a skewed slot which is neither longitudinal nor radial. Yet another type of slot is shown in FIG. 8. Slots 62 are of cylindrical shape, resulting in segments 53 of different shape. Clearly a plurality of slot designs are possible anyone of which can work with the bending clamping action of this invention.

Figure 6:
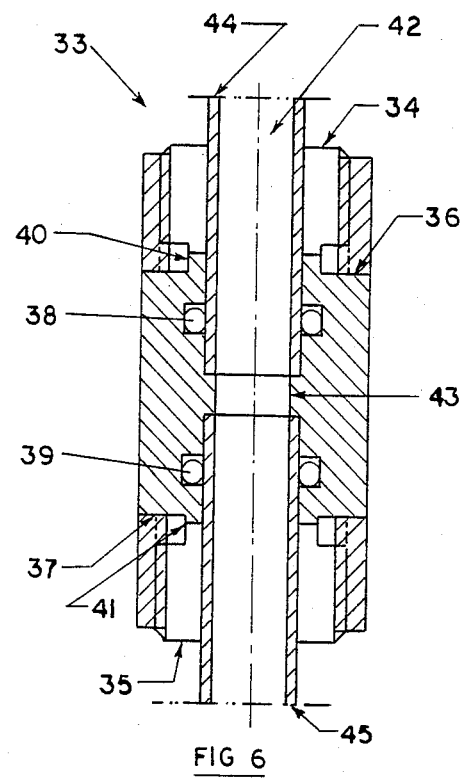
FIG. 6 shows a view of another embodiment of the fitting. In this embodiment the fitting has two split segmented ends and two nuts so that two workpieces may be joined.

Looking next at FIG. 6 there is illustrated a fitting embodiment, 33, with two split segmented ends, 34, 35; two camming or force reactive surfaces, 36, 37, two "O" rings, 38, 39; two indentations, 40, 41; and an axial passageway, 42, running from end to end of the fitting 33. Also shown in FIG. 6 is a workpiece connector, 43, which allows two workpieces, 44, 45, or tubes of the same size to be joined. Tubes 44 and 45 are clamped into place by the cantilever bending action of fitting 10 as nuts on ends 34 and 35 are tightened against camming surfaces 36 and 37 respectively.

Figure 7:
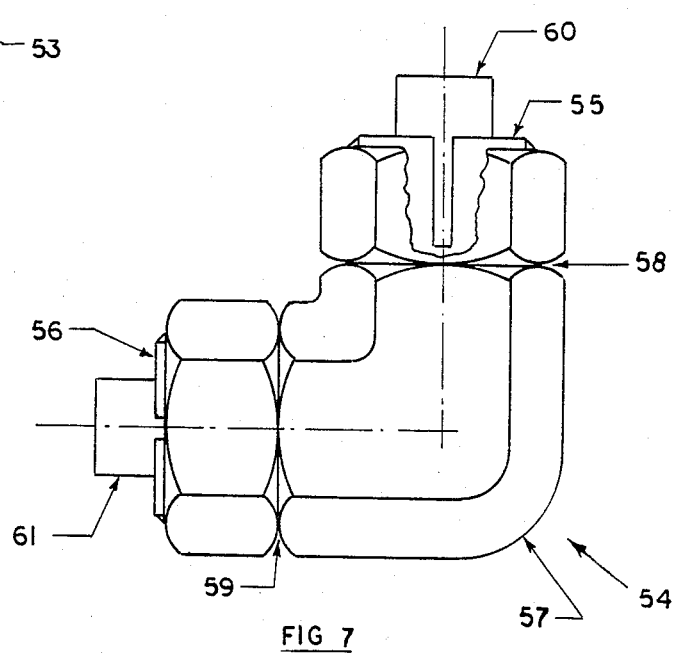
FIG. 7 shows a view of yet another embodiment of the fitting. In this embodiment the fitting has two split segmented ends and a main body shaped as an elbow. Two workpieces are also shown.

Yet another fitting embodiment, 54, is shown in FIG. 7. Fitting embodiment 54 has two segmented ends, 55 and 56, and a main body, 57, which is bent into "elbow" form. Two camming or force reactive surfaces, 58 and 59, are used. Fitting embodiment 54 allows the joining of two workpieces, 60 and 61, which must be joined at an angle.

Clearly a wide variety of main body shapes may be used with the fitting of the invention. Other possible body shapes include, but are not limited to, reducer unions, female connectors, male and female elbows, tube tees, male and female side tees, male and female run tee, tube crosses, bulkhead unions, bulkhead elbows, and bulkhead tees.

Embodiments 10, 33, and 54 depend on a dual coaction of forces; the first of these coactions is that of a nut against a camming or reactive force surface, the second of these coactions is that of the threads of the nut upon the external threads of a cantilever segment. These two coactions result in the inward motion of the segments causing the segments to act as jaws and rigidly clamp the workpiece in place.

It is now believed that the unique construction features and coactions of the invention have been detailed for those skilled in the art not only to be able to understand and use the embodiments herein presented, but also to devise variations thereof which fall within the spirit and scope of the invention.

We claim:

1. A cantilever clamp action fitting having a longitudinal axis therethrough and comprising at least one internally threaded nut and a main circumferentially continuous body, said body comprising:
an axial passage extending from end to end of the body,
at least one externally threaded segmented end having slots dividing the end into a plurality of segments,
a transversal surface corresponding to the segmented end extending outwardly to the perimeter of the main body,
said transversal surface being substantially symmetrical about the longitudinal axis and being smaller than or equal to the external dimensions of said nut,
said transversal surface being separated axially from said segmented end and said transversal surface being generally perpendicular to said longitudinal axis and forming a camming or reactive force surface for said nut;

said threads on said nut and said segments each having tapered side walls, whereby a reactive force felt by the nut as the nut is tightened against said transversal surface is transmitted, via the internal nut threads reacting on the externally segment threads, to the segments of said segmented ends, and both radial and longitudinal components of the reactive force contribute to bending of the segments and cause each segment to bend inwardly toward the longitudinal axis thereby clamping tightly a workpiece placed in the axial passageway of the fitting.

2. A fitting according to claim 1, in which the slots in the segmented end extend longitudinally from the distal end of the segmented end to the point of separation between the transversal surface and the segmented end.

3. A fitting according to claim 1 in which said end segment dividing slots are longitudinal but do not intersect the axial axis of the fitting.

4. A fitting according to claim 1 whose main body contains a plurality of split segmented ends.

5. A fitting according to claim 1 possessing two split segmented ends whose main body is curved into an elbow shape.

6. A fitting according to claim 1, wherein the threads of the nut and segmented end are substantially straight.

7. A fitting according to claim 1, wherein the transversal surface is separated from the segmented end by an indentation in the main body extending radially inwardly.

8. A fitting according to claim 2, wherein the transversal surface is separated from the segmented end by an indentation in the main body extending radially inwardly.

9. A fitting according to claim 8, wherein the internal nut threads and external segmented end threads are straight and substantially correspond to each other.

10. A fitting according to claim 1, wherein the main body has incorporated therein an "O" ring to engage with the workpiece.

11. A fitting according to claim 1, wherein the axial passageway has a central axis which is a straight line.

12. A fitting according to claim 1, wherein the segmented end has 3 or 4 segments.

* * * * *